US009489976B2

(12) United States Patent
Jury et al.

(10) Patent No.: US 9,489,976 B2
(45) Date of Patent: Nov. 8, 2016

(54) NOISE PREDICTION DETECTOR ADAPTATION IN TRANSFORMED SPACE

(71) Applicant: Seagate Technology LLC, Cupertino, CA (US)

(72) Inventors: Jason Charles Jury, Minneapolis, MN (US); Raman C. Venkataramani, Longmont, CO (US); William M. Radich, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/679,052

(22) Filed: Apr. 6, 2015

(65) Prior Publication Data

US 2016/0293205 A1 Oct. 6, 2016

(51) Int. Cl.
*G11B 5/09* (2006.01)
*G11B 5/02* (2006.01)
*G11B 20/10* (2006.01)

(52) U.S. Cl.
CPC .............................. *G11B 20/10046* (2013.01)

(58) Field of Classification Search
CPC .......... G11B 2220/90; G11B 2220/20; G11B 27/11; G11B 27/36; G11B 5/59655; G11B 20/10009; G11B 5/012; G11B 5/09; G11B 5/035
USPC ................ 360/29, 31, 39, 50, 53, 55, 65, 67
See application file for complete search history.

(56) References Cited

U.S. PATENT DOCUMENTS

| | | | |
|---|---|---|---|
| 5,968,198 A | 10/1999 | Hassan et al. | |
| 6,889,154 B2 | 5/2005 | Ashley et al. | |
| 8,290,102 B2 | 10/2012 | Kaynak et al. | |
| 8,489,971 B1 | 7/2013 | Chan et al. | |
| 2008/0192378 A1* | 8/2008 | Bliss | G11B 20/10296 360/69 |

* cited by examiner

*Primary Examiner* — Nabil Hindi
(74) *Attorney, Agent, or Firm* — Taylor English Duma LLP

(57) ABSTRACT

Technologies are described herein for adapting channel parameters of a read channel in a transformed space. A set of channel parameter values associated with one or more components of the read channel is received. A general transformation is performed on the channel parameter values, and insignificant terms in the transformed space are filtered out. Next, an inverse transformation is performed on the filtered terms in the transformed space to calculate a new set of channel parameter values for the component(s).

20 Claims, 5 Drawing Sheets

NOISE PREDICTION DETECTOR ADAPTATION IN TRANSFORMED SPACE

BRIEF SUMMARY

The present disclosure relates to technologies for adapting channel parameters of a read channel, such as in the magnetic read channel of a hard-disk drive ("HDD") device, in a transformed space. According to some embodiments, a method comprises receiving a set of channel parameter values associated with one or more components of the read channel. A general transformation is performed on the channel parameter values, and insignificant terms in the transformed space are filtered out. For example, those terms having corresponding values in the transformed space within a threshold range of zero may have their value set to zero. Next, an inverse transformation is performed on the filtered terms in the transformed space to calculate a new set of channel parameter values for the component(s).

According to further embodiments, an adaptive read channel system comprises a read channel including at least one adaptive component and a processor operably connected to the at least one adaptive component. The processor is configured to receive a set of channel parameter values associated with the adaptive component and perform a general transformation on the channel parameter values. Insignificant terms in the transformed space are filtered out and an inverse transformation is performed on the filtered terms in the transformed space to calculate a new set of channel parameter values for the adaptive component.

According to further embodiments, a computer-readable medium has processor-executable instructions stored thereon that, when executed by a digital signal processor ("DSP") or other general processor, cause the processor to receive a set of channel parameter values associated with an adaptive component in a read channel. The processor then performs a transformation on the channel parameter values and filters out insignificant terms in the transformed space. Finally, the processor performs an inverse transformation on the terms in the transformed space to calculate a new set of channel parameter values for the adaptive component.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for adapting channel parameters of a read channel in a transformed space. The read channel may be implemented in a storage device, such as a hard-disk drive ("HDD") device. The HDD device may increase data detection and decoding performance by utilizing a read channel architecture that includes one or more adaptive components and/or modules. The adaptive components and modules adapt the signal from the read channel to fit the implemented detection/decoding mechanism and to account for noise introduced in the channel, such as electronics noise, transition jitter noise, non-linear transition shift, and the like. These adaptive components may include a maximum-a-posteriori ("MAP") detector or a soft output Viterbi algorithm ("SOVA") detector incorporating data-dependent noise prediction ("DDNP"), for example.

DDNP detectors utilize neighboring samples (past and future) to reduce the power of noise in the read signal resulting in significant detection performance improvement and lower bit-error rates ("BER") over traditional channel detectors. The DDNP detector uses various channel parameters that are calibrated for the read channel for each data pattern (condition) in the detection algorithm. The channel parameters may include bias values, prediction error variances, noise-whitening filter values, and the like. Initial optimized parameter values may be determined by collecting the noise statistics for each condition in the read channel during the manufacturer of HDD device, through channel simulations and/or during a training phase of the initial certification testing ("CERT") of the device.

However, because the channel conditions for the device may change over time in normal operation, the channel parameters must be adapted to changing channel conditions in order to maintain performance of the detector. For example, the parameter values associated with the DDNP-SOVA detector may be re-calibrated by a least mean squares ("LMS") algorithm or some variation of recursive least-squares ("RLS") Wiener filtering to reflect changes in channel conditions. These conventional adaptation techniques are performed for each parameter value independently without consideration of other parameter values, resulting in a computationally intensive operation for adaptation. However, these parameter values usually have some collectively similar or predictable behavior and structure. This behavior can be better observed by applying a transformation to the parameters. When the transformed DDNP-SOVA parameters are analyzed, the collective behavior and structure is revealed, allowing for substantial simplification and increased performance in parameter adaptation. The increased performance is particularly significant as the complexity of the SOVA increases (e.g., by increasing the number of pattern states or conditions).

Figure 1:
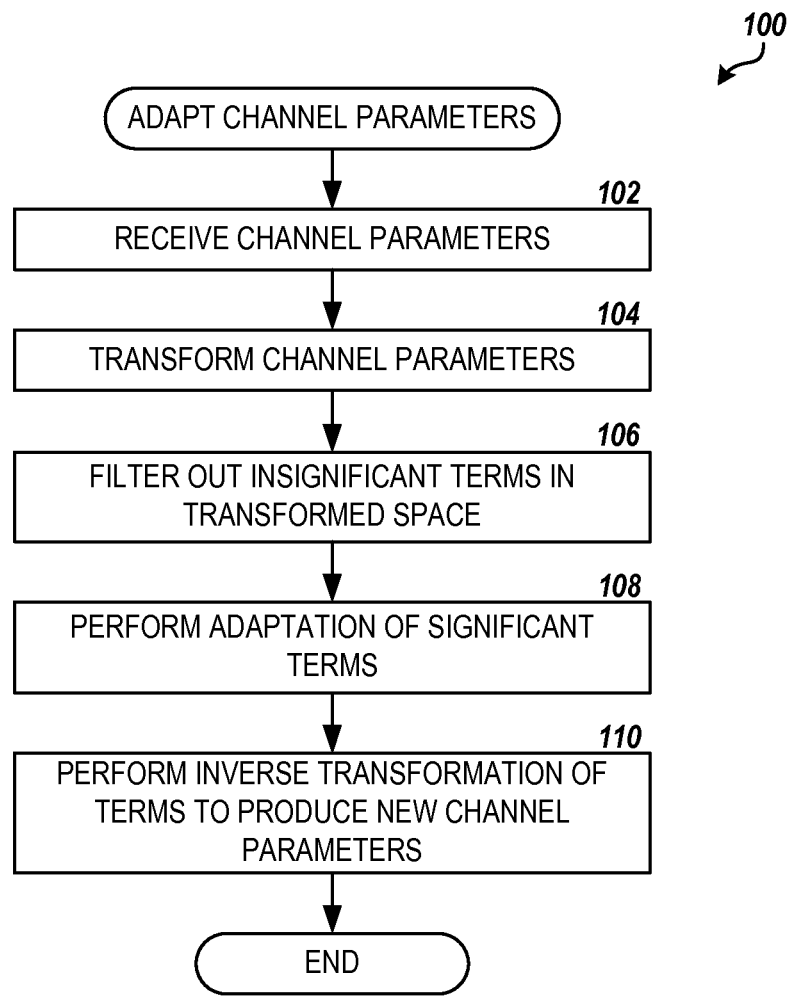
FIG. 1 is a flow diagram showing one routine for adapting channel parameters of a read channel in a transformed space, according to embodiments described herein.
Figure 2:
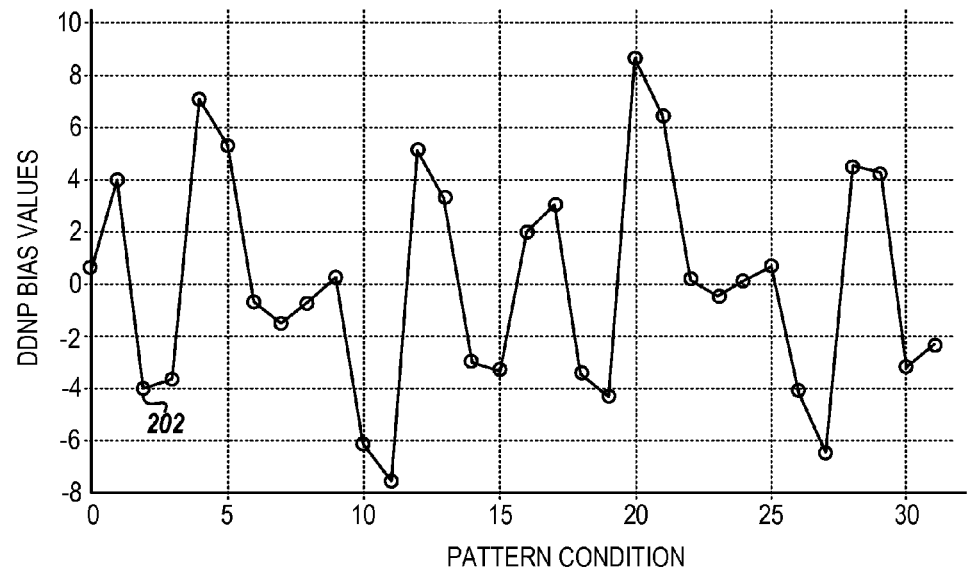
FIGS. 2 and 4 are graphs of channel parameter values for a component in a read channel corresponding to a set of patterns or conditions in a detector of the read channel, according to embodiments described herein.

According to some embodiments described herein, a faster and more robust adaptation training and calibration of channel parameters may be achieved by using a general transformation to transform the parameter values and performing the adaptation in the transformed space. FIG. 1 provides an overview of an improved method for the adaptation of channel parameters, according to the embodiments described herein. Specifically, FIG. 1 illustrates one routine 100 for adapting channel parameters of a read channel in a transformed space. According to some embodiments, the routine 100 may be performed in a controller of a storage device, such as an HDD device. The routine 100 includes step 102, where a set of channel parameter values is received at or stored in the controller. For example, a set of bias parameters for DDNP-SOVA detection component may be generated during initial training of the read/write channel in the device. The set of bias parameters may comprise a value or term, such as term 202, associated with each pattern or condition in the detection algorithm, as shown in FIG. 2.

Next, the routine 100 proceeds to step 104, where the set of channel parameters is transformed utilizing a general transformation to reveal the underlying similar or predictable behavior and structure in the values. For example, a Hadamard transformation may be utilized to determine the parameter values in the transformed space. For example, for 5-bit pattern conditions there are 32 DDNP-SOVA bias terms, and there would initially be 32 terms in the transformed space corresponding to bias. According to some embodiments, the 32 transformed terms $y_1 \ldots y_{32}$ may be determined by multiplying a matrix of the bias terms $b_0 \ldots b_{31}$ by the Hadamard matrix $H_5$ as follows:

$$\begin{bmatrix} y_1 \\ y_2 \\ y_3 \\ \vdots \\ y_{32} \end{bmatrix} = \begin{bmatrix} -1 & 1 & 1 & \ldots & 1 \\ 1 & -1 & 1 & \ldots & 1 \\ 1 & 1 & -1 & \ldots & 1 \\ \vdots & & & & \vdots \\ 1 & 1 & 1 & \ldots & -1 \end{bmatrix} \begin{bmatrix} b_0 \\ b_1 \\ b_2 \\ \vdots \\ b_{31} \end{bmatrix}$$

Figure 3:
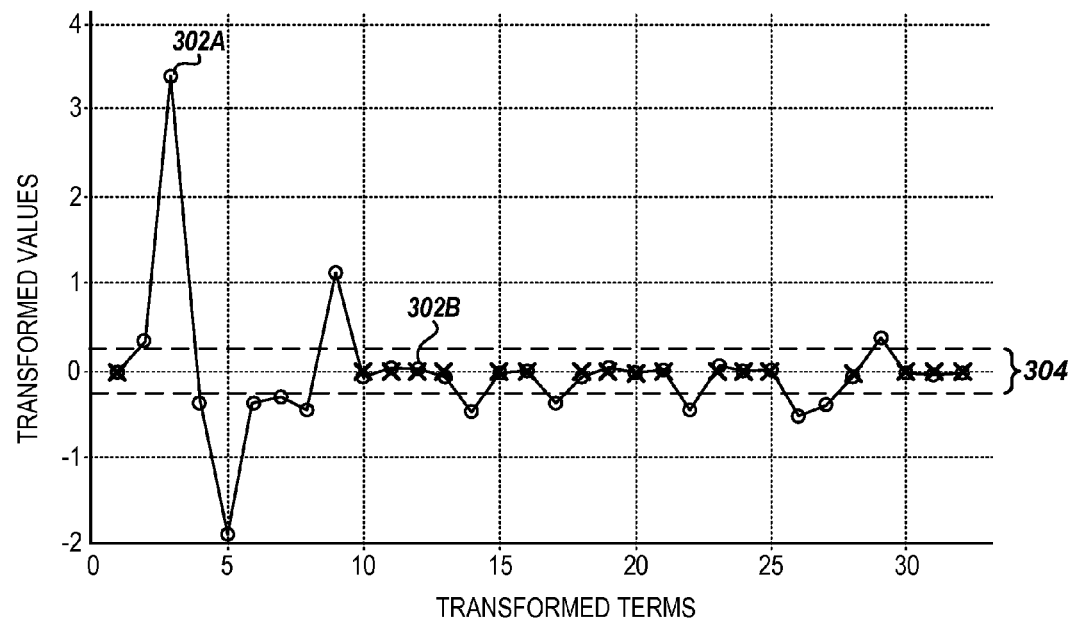
FIG. 3 is a graph of a set of terms in a transformed space corresponding to the channel parameter values of FIG. 2, according to embodiments described herein.

FIG. 3 shows an example of the term values, such as term values 302A and 302B, corresponding to the bias terms in the transformed space, according to some embodiments.

From step 104, the routine 100 proceeds to step 106, where the statistically insignificant terms in the transformed space are filtered out. According to some embodiments, this is accomplished by identifying those terms where the transformed values are within a threshold range 304 around zero and setting their values to zero. The threshold range 304 may be determined based on the number of terms, the mean and standard deviation of the transformed values, and the like. In some embodiments, the threshold range may be ±0.1. Those terms falling within the threshold range, such as term value 302B, may be determined as being statistically insignificant, while the terms outside of the threshold range, such as term value 302A, are determined to be significant. Continuing with the example described above in regard to FIG. 3, 18 of the 32 term values corresponding to bias in the transformed space may fall within the threshold range 304 and therefore may be set to zero.

According to some embodiments, the threshold range may be developed by performing repeated training of the full DDNP-SOVA parameters to determine those terms that are statistically significant. This repeated training may be performed in a channel simulator for a class of drives or for individual drives during configuration and initial testing, for example. From this analysis, a threshold range can be determined that would yield nearly the same set of significant transformed parameters in a single training session. For example, the DDNP-SOVA parameters could be trained 20 times, and the transformed terms that vary significantly away from 0 could be identified. A base threshold range could then be established such that the remaining, insignificant terms are included in the threshold range some percentage of the time, such as 95% of the time. In further embodiments, the threshold range may be verified in a simulation or an actual storage device, based primary on SNR performance (e.g., Bit-Error-Rate, or Sector-Failure-Rate, etc.).

In some embodiments, the routine 100 then proceeds to step 108 where the adaptation of the significant terms, i.e., those not set to zero, may be performed in the transformed space. For example, as shown in FIG. 3, only the 14 remaining significant terms may be calibrated, thus reducing the computational requirements of the adaptation significantly. In addition, adaptation of the terms in the transformed space may increase the performance and stability of the adaptive algorithm.

The computational methods used to adapt the terms in the transformed space may depend on the parameter terms being adapted. For example, in general DDNP-SOVA, a whitened error is used in the branch metric calculation. The whitened error involves filtering a received signal $z_n$ with a whitening filter (whose coefficients are given by $w_l$), then subtracting off a mean (bias) term m:

$$d_n = \sum_{l=0}^{L} w_l(T_n) z_{n-l} - m(T_n).$$

The whitening filter coefficients and mean are explicitly dependent on the condition in the SOVA detector, as noted by their dependence on $T_n$. It is assumed that there are N total conditions under consideration (e.g., N=32 in the standard DDNP-SOVA). The whitened error variance C becomes the metric used for adapting the mean terms:

$$C = \sum_n d_n^2.$$

The LMS adaptation of the mean terms is given by the expression:

$$m(T_n) \leftarrow m(T_n) - \mu_m \partial d_n^2 / \partial \mu(T_n) = m(T_n) + 2\mu_m d_n,$$

where $\mu_m$ is the LMS update gain. The array m of mean terms for each of the N possible conditions can be summarized as follows:

$$m = [m(T_n=1) \ldots m(T_n=N)]^T.$$

The Hadamard transformation can be expressed with a linear transformation operation as involving the mean array m, the transformation matrix G, and the array of transformed coefficient values q:

$$q = Gm$$

and $$m = G^T q.$$

In general the individual elements of the transformation matrix can be expressed as follows:

$$G = \begin{bmatrix} g(T_n=1, k=1) & g(T_n=1, k=2) & \ldots & g(T_n=1, k=N) \\ g(T_n=2, k=1) & g(T_n=2, k=2) & \ldots & g(T_n=2, k=N) \\ \vdots & \vdots & \ddots & \vdots \\ g(T_n=N, k=1) & g(T_n=N, k=2) & \ldots & g(T_n=N, k=N) \end{bmatrix}$$

and $$g(T_n)=[g(T_n,k=1) \ldots g(T_n,k=N)]^T.$$

With these, the mean values $m(T_n)$ can be expressed as follows:

$$m(T_n) = \sum_k g(T_n, k)q_k = g(T_n)^T q,$$

where q is the transformed coefficient array:

$$q=[q_1 \ldots q_N]^T.$$

The whitened error becomes:

$$d_n = \sum_{l=0}^{L} w_l(T_n)z_{n-l} - g(T_n)^T q.$$

For the case of Hadamard transformation of N terms, there are N operations needed to calculate the additional contribution of $g(T_n)^T q$ to the whitened error. However, only the subset of the transformed coefficients deemed statistically significant may be utilized. Thus the number of active transformed terms would be much less than N, reducing the number of operations accordingly. The LMS update equation for the transformed coefficient values becomes:

$$q_k \leftarrow q_k - \mu_k \partial d_n^2/\partial q_k = q_k + \mu_k d_n \cdot g(T_n,k),$$

where $\mu_k$ is the update gain for the k-th transformed coefficient $q_k$. At an instant in time, there could be an updates for each element $q_k$ in the transformed array q. In general this would mean N updates, but filtering the transformed coefficients prior to adaptation leads to a reduction in the number of operations needed for updating. In other embodiments, during adaptation phase, an update to all the DDNP-SOVA parameter values may be estimated based on updates to terms in the transformed space.

Figure 4:
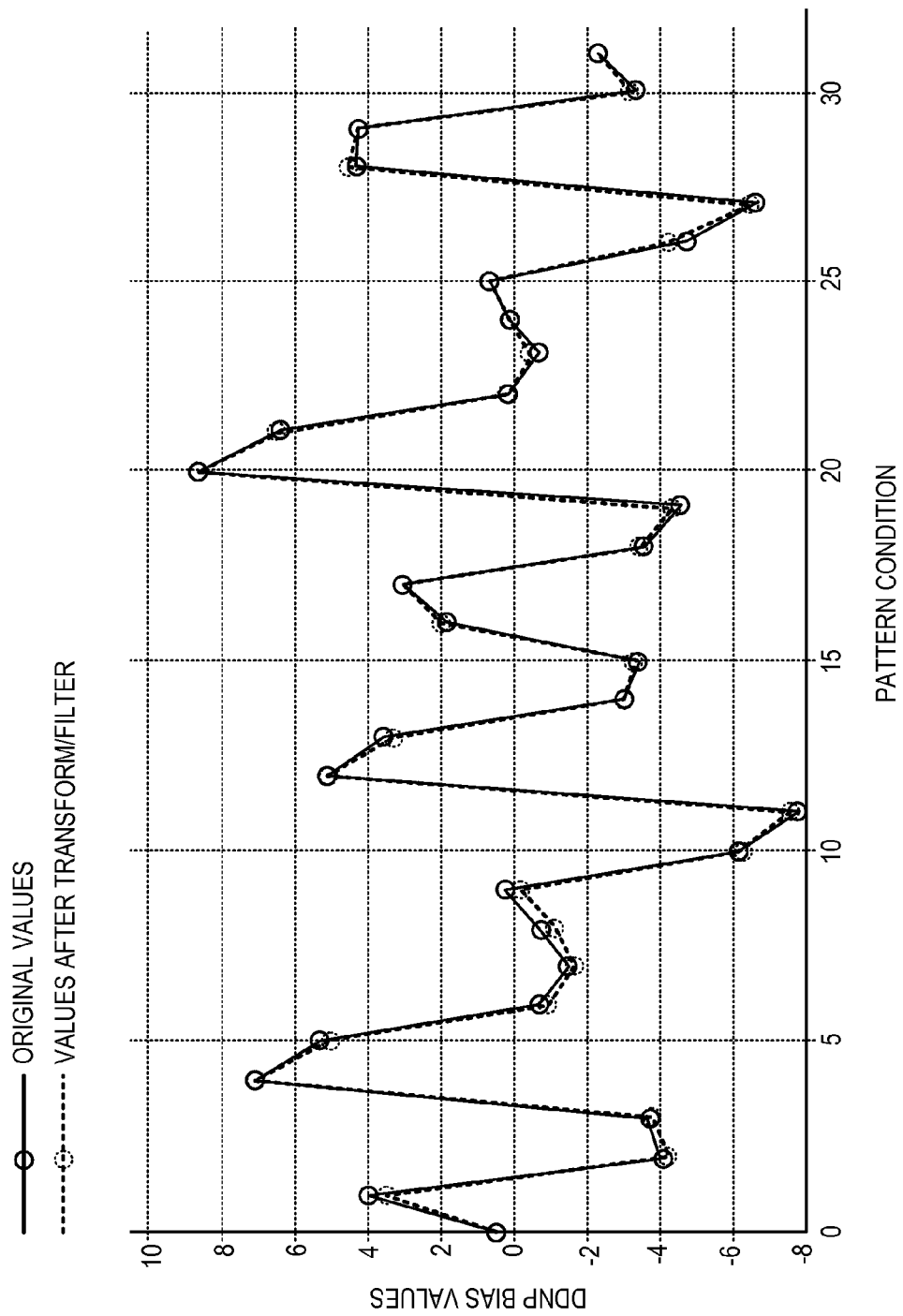

Next, the routine 100 proceeds to step 110, where an inverse transform is utilized to calculate the new channel parameter values from the filtered and/or re-calibrated transformed values. For example, an inverse of the Hadamard transform may be utilized to calculate new DDNP-SOVA bias terms $b_0 \ldots b_{31}$ from the adapted term values $y_1 \ldots y_{32}$ in the transformed space. FIG. 4 provides an illustration of the difference between original DDNP-SOVA bias term values and values after the transformation and filtering of statistically insignificant values. As may be seen in the figure, setting the insignificant terms to zero in the transformed space has negligible impact on the bias terms. From step 110, the routine 100 ends.

In further embodiments, the transformation of parameters may be used as a method of compressing the storage of DDNP-SOVA parameters. For example, only the significant transformed parameter values may be stored in a memory of the storage device. Thus the number of stored transformed parameters may be significantly less than the number of "normal space" DDNP-SOVA parameters, e.g., 14 significant values in the transformed space versus 32 bias terms for a standard DDNP-SOVA, as shown above. This may represent a significant storage savings when the number of parameter values is very large, such as 1024 bias terms for a TDMR DDNP-SOVA. Conventional adaptation may be performed in the normal space, but the initial values for the DDNP-SOVA parameters may be generated by inverse-transforming the reduced set of transformed parameter values stored in memory. This initialization may be performed each time new DDNP-SOVA parameters are loaded into the channel, such as at the start of a new read command involving a different head and/or track. Also, after adaptation, the significant transformed values of the DDNP-SOVA parameters may be re-saved at the end of the command if they have changed significantly.

Figure 5:
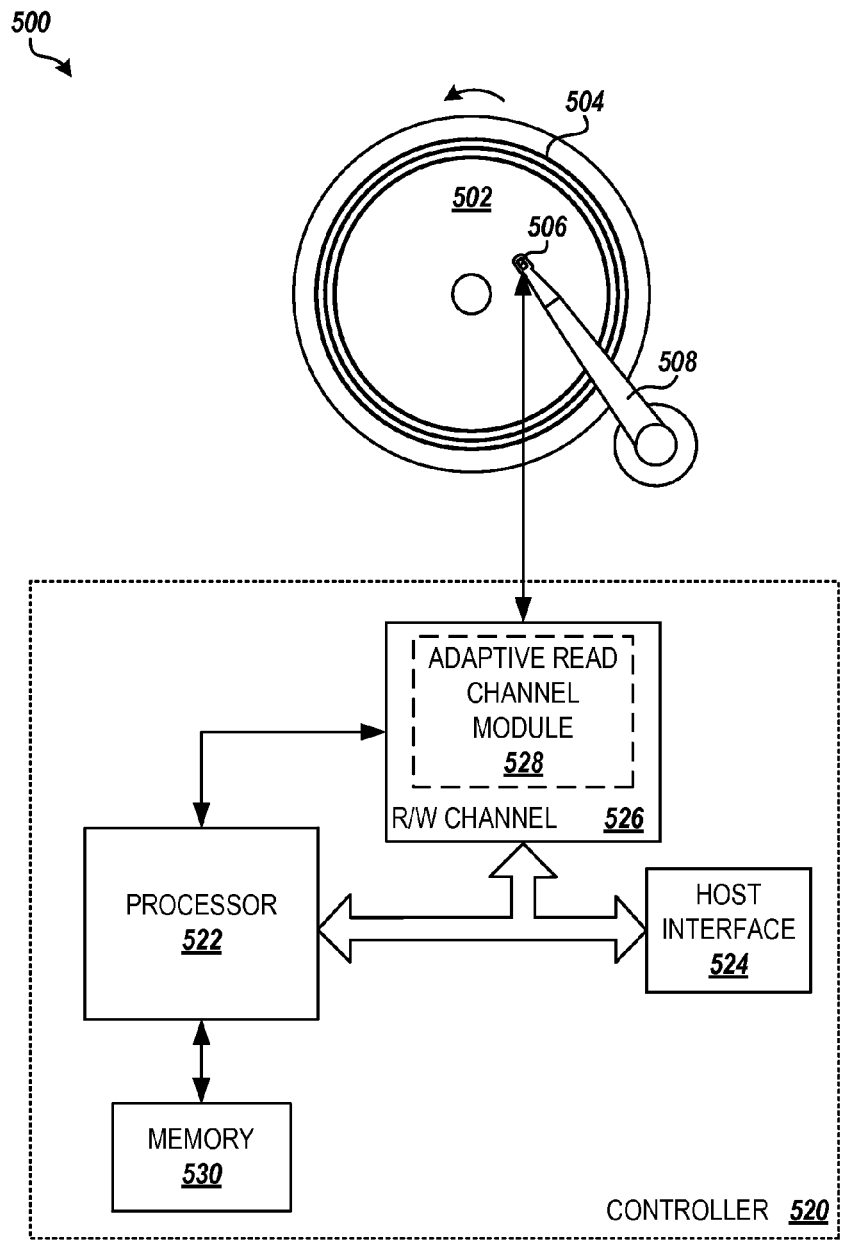
FIG. 5 is a block diagram showing an illustrative environment for adapting channel parameters of a read channel in a transformed space in a storage device, according to embodiments described herein.

FIG. 5 and the following description are intended to provide a general description of a suitable environment in which the embodiments described herein may be implemented. In particular, FIG. 5 shows an illustrative storage device 500, such as an HDD apparatus, along with hardware, software and components for adapting channel parameters of a read channel in a transformed space, according to the embodiments provided herein. The storage device 500 may include recording media comprising at least one platter or disk 502. The disk(s) 502 may include a magnetic recording surface divided or "formatted" into a number of individual data tracks, such as data track 504. The data tracks 504 may represent substantially concentric circular areas on the surface of the disk 502.

The storage device 500 further includes at least one read/write head 506 located adjacent to the recording surface of each disk 502. The read/write head 506 may read information from the disk 502 by sensing a magnetic field formed on portions of the surface of the disk, and may write information to the disk by magnetizing a portion of the surface of the disk. The read/write head 506 may be located at the distal end of an arm 508 that rotates in order to reposition the read/write head 506. The read/write head 506 may incorporate multiple components not shown in the figure or described herein, including reader elements, such as magneto-resistive ("MR") readers, tunneling MR readers, or the like, writer elements, head heaters, air bearings, and the like.

The storage device 500 may further comprise a controller 520 that controls the operations of the storage device. The controller 520 may include a processor 522. The processor 522 may implement an interface 524 allowing the storage device 500 to communicate with a host device, other parts of storage device 500, or other components, such as a server computer, personal computer ("PC"), laptop, tablet, game console, set-top box or any other electronics device that can be communicatively coupled to the storage device 500 to store and retrieve data from the storage device. The processor 522 may process write commands from the host device by formatting the associated data and transfer the formatted data via a read/write channel 526 through the read/write head 506 and to the surface of the disk 502. The processor 522 may further process read commands from the host device by determining the location of the desired data on the surface of the disk 502, moving the read/write head(s) 506 over the determined location, reading the data from the surface of the disk via the read/write channel 526, correcting any errors and formatting the data for transfer to the host device.

The read/write channel 526 may convert data between the digital signals processed by the processor 522 and the analog read and write signals conducted through the read/write head 506 for reading and writing data to the surface of the disk 502. The analog signals to and from the read/write head 506 may be further processed through a pre-amplifier circuit. The read/write channel 526 may further provide servo data read from the disk 502 to an actuator to position the read/write head 506. The read/write head 506 may be positioned to read or write data to a specific location on the on the recording surface of the disk 502 by moving the read/write head 506 radially across the data tracks 504 using the actuator while a motor rotates the disk to bring the target location under the read/write head.

According to embodiments, the controller 520 may further contain an adaptive read channel module 528. According to embodiments, the adaptive read channel module 528 receives the read-signal from the read/write head 506 and adapts the signal for the detection/decoding mechanism implemented in the storage device 500. The adaptive read channel module 528 may comprise hardware circuits in the read/write channel 526, such as a digital signal processor ("DSP"), processor-executable instructions for execution in the processor 522 or a DSP, or any combination of these and other components in the controller 520. The adaptive read channel module 528 may implement the various sub components described herein for adapting channel parameters of a read channel in a transformed space.

The controller 520 may further include a computer-readable storage medium or "memory" 530 for storing processor-executable instructions, data structures and other information. The memory 530 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 530 may further comprise a portion of the storage media of the storage device 500, such as the maintenance cylinder ("M/C") of the disk 502. For example, the memory 530 may store a firmware that comprises commands and data necessary for performing the operations of the storage device 500. According to some embodiments, the memory 530 may store processor-executable instructions that, when executed by the processor, perform the routine 100 for adapting channel parameters of a read channel in a transformed space of the storage device 500, as described herein.

In addition to the memory 530, the environment may include other computer-readable media storing program modules, data structures, and other data described herein for adapting channel parameters of a read channel in a transformed space of the storage device 500. It will be appreciated by those skilled in the art that computer-readable media can be any available media that may be accessed by the controller 520 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 500 may be different than that illustrated in FIG. 5 and described herein. For example, the processor 522, read/write channel 526, memory 530 and other components and circuitry of the storage device 500 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 500 may not include all of the components shown in FIG. 5, may include other components that are not explicitly shown in FIG. 5 or may utilize an architecture completely different than that shown in FIG. 5.

Figure 6:
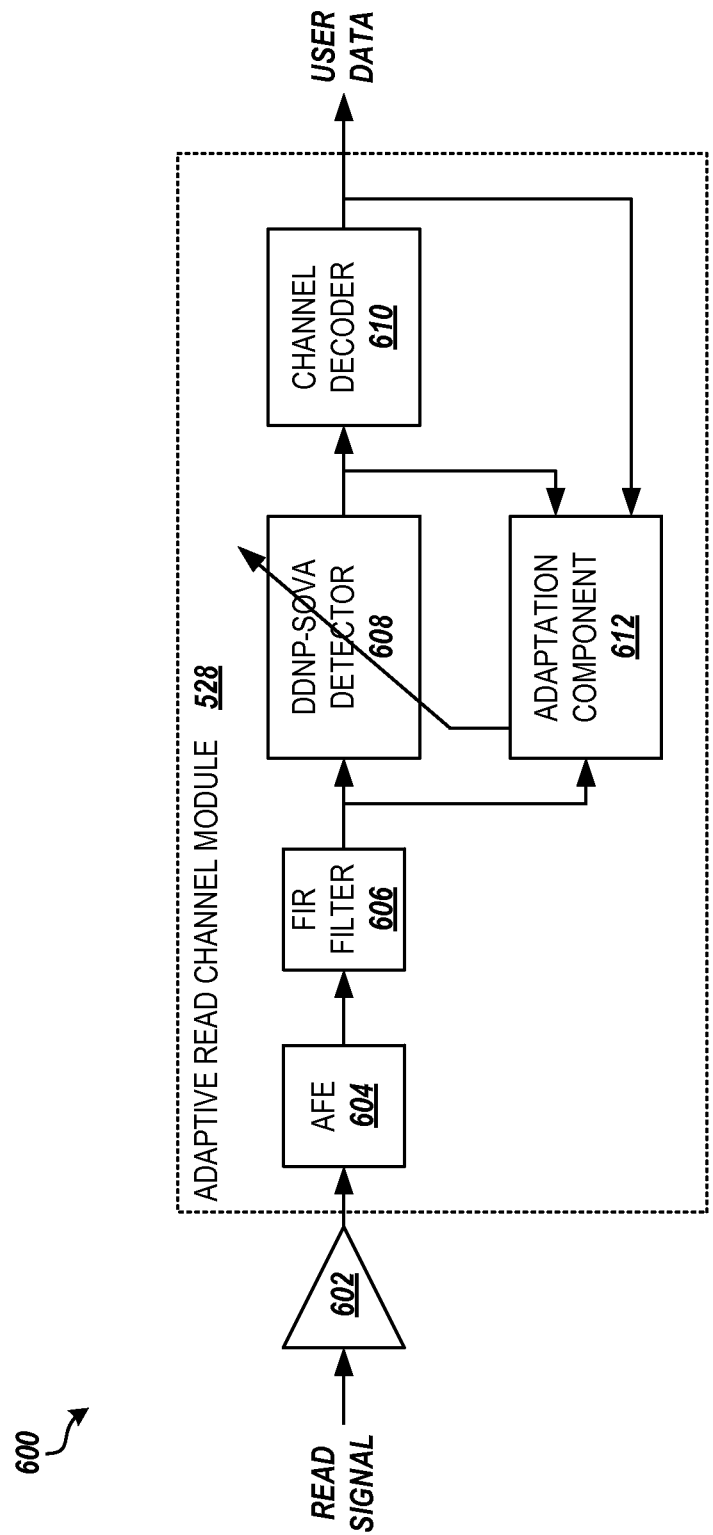
FIG. 6 is a block diagram showing additional details of an adaptive read channel architecture for adapting channel parameters of a read channel in a transformed space, according to embodiments described herein.

FIG. 6 provides additional details of an adaptive read channel architecture 600 capable of adapting channel parameters in a transformed space, according to embodiments. During a read operation by the storage device, the read-signal from the read/write head 506 may pass through signal pre-processing elements 602 before being received at the adaptive read channel module 528. The pre-processing elements 602 may include a pre-amplifier and the like. The received read signal is processed through an analog front-end ("AFE") 604. The AFE 604 may include a programmable or variable-gain amplifier, analog filters or conditioners, an analog-to-digital converter ("ADC"), and the like. The digitized (sampled) read-signal from the AFE 604 is passed to a digital finite impulse response ("FIR") filter 606. The FIR filter 606 may further filter and condition the samples received from AFE 604. The FIR filter 606 may also be referred to as an "equalizer." The filtered signal may then pass to the DDNP-SOVA detector 608 detects the data represented in the transitions of the read signal while minimizing the influence of noise in the detection process. The read-signal is then sent to the channel decoder 610 where the user data is decoded from the data signal.

In general, the DDNP and detection process is performed based on the input read-signal from the FIR filter 606 (equalizer) and a set of channel parameters provided by an adaptation component 612. The adaptation component 612 may utilize any combination of the read-signal from the equalizer, the data produced by the DDNP-SOVA detector, and the decoded user data to adapt the channel parameters to the current channel conditions and improve detection performance. The computed channel parameters may include bias values, prediction error variances, noise-whitening filter values, and the like. The adaptation component may be implemented in the read/write channel architecture, in software for execution on the processor 522 or a DSP in the controller, or in some combination of these and other components. According to some embodiments, the adaptation component 612 implements the embodiments described herein for adapting channel parameters of a read channel in a transformed space.

In a further embodiment, the DDNP-SOVA detector 608 and the adaptation component 612 may be configured to work with parameter values in the transformed space. In a very complex detection scenario, such as a two-dimensional magnetic recording ("TDMR") or multi-signal magnetic recording ("MSMR") scenario, where there may be 1024 conventional bias values along with 1024 variances and 3072 noise-whitening filter tap values, for example, working with the terms in the transformed space (with a significant portion of the terms being set to zero) may significantly improve performance of both the re-calibration/adaptation algorithms as well as the DDNP algorithms. This may also reduce size and complexity of storage of the channel parameters as well in that only the significant term values would need to be stored.

It will be appreciated that the components of the adaptive read channel module 528 may be different than that illustrated in FIG. 6 and described herein. For example, the adaptive read channel module 528 may contain multiple, parallel signal paths, each containing separate adaptive components and feeding separate channel detector/decoders 312 so that the read-signal may be adapted and decoded using multiple sets of adaptive parameters simultaneously. Similarly, the illustrated connection pathways are provided for purposes of illustration and not of limitation, and some components and/or interconnections may be omitted for purposes of clarity.

Based on the foregoing, it will be appreciated that technologies for adapting channel parameters of a read channel in a transformed space are presented herein. While embodiments are described herein in regard to an HDD device having an adaptive read channel architecture, it will also be appreciated that the embodiments described in this disclosure may be utilized in the read channel of any other communication or storage device for adaptation of channel parameters. This may include a magnetic disk drive, a hybrid magnetic and solid state drive, a magnetic tape drive, an optical disk drive, a communications receiver or transceiver device such as a cellphone, and the like. Further, the embodiments described herein for adaptation of channel parameters in the transformed space may be applied to any channel parameters beyond the DDNP-SOVA bias parameters described herein, including DDNP prediction error variances or noise-whitening filter values, parameters for an adaptive digital FIR filter or NPML predictor, and/or the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   receiving a set of channel parameter values;
   performing a transformation on the set of channel parameter values to produce terms in a transformed space;
   filtering out insignificant terms in the transformed space; and
   performing an inverse transformation on the terms in the transformed space to calculate a new set of channel parameter values.

2. The method of claim 1, wherein filtering out the insignificant terms comprises determining those terms in the transformed space having a value within a threshold range around zero and setting the value of those terms to zero.

3. The method of claim 1, wherein performing the transformation on the set of channel parameter values comprises multiplying the set of channel parameter values by a Hadamard matrix.

4. The method of claim 1, further comprising the steps of:
   upon filtering out the insignificant terms, perform an adaptation of remaining terms in the transformed space.

5. The method of claim 1, wherein the set of channel parameter values are utilized to process a read signal in a read channel of a communication device.

6. The method of claim 1, wherein the set of channel parameter values are utilized by a data-dependent noise prediction ("DDNP") detector in a read channel.

7. The method of claim 6, wherein the set of channel parameter values are utilized in a magnetic storage device and comprise at least one of DDNP bias values, DDNP prediction error variances, and DDNP noise-whitening filter values.

8. An adaptive read channel system comprising:
   a read channel including at least one adaptive component; and
   a processor operably connected to the at least one adaptive component and configured to
   receive channel parameter values associated with the adaptive component,
   perform a transformation on the channel parameter values to produce terms in a transformed space,
   filter out insignificant terms in the transformed space, and
   perform an inverse transformation on the terms in the transformed space to calculate new channel parameter values for the adaptive component.

9. The adaptive read channel system of claim 8, wherein filtering out the insignificant terms comprises determining those terms in the transformed space having a value within a threshold range around zero and setting the value of those terms to zero.

10. The adaptive read channel system of claim 8, wherein performing the transformation on the channel parameter values comprises multiplying the channel parameter values by a Hadamard matrix.

11. The adaptive read channel system of claim 8, further comprising the steps of:
    upon filtering out the insignificant terms, perform an adaptation of remaining terms in the transformed space.

12. The adaptive read channel system of claim 8, wherein the at least one adaptive component comprises a data-dependent noise prediction ("DDNP") detector.

13. The adaptive read channel system of claim 12, wherein the channel parameter values comprise at least one of DDNP bias values, DDNP prediction error variances, and DDNP noise-whitening filter values and the adaptive read channel system is implemented in a magnetic storage device.

14. The adaptive read channel system of claim 13, wherein the magnetic storage device utilizes two-dimensional magnetic recording.

15. A non-transitory computer-readable medium having processor-executable instructions stored thereon that, when executed by a processor, cause the processor to:
- receive a set of channel parameter values associated with an adaptive component in a read channel;
- perform a transformation on the set of channel parameter values to produce terms in a transformed space;
- filter out insignificant terms in the transformed space; and
- perform an inverse transformation on the terms in the transformed space to calculate a new set of channel parameter values for the adaptive component.

16. The computer-readable medium of claim 15, wherein performing the transformation on the set of channel parameter values comprises multiplying the set of channel parameter values by a Hadamard matrix.

17. The computer-readable medium of claim 15, further comprising the steps of:
- upon filtering out the insignificant terms, perform an adaptation of remaining terms in the transformed space.

18. The computer-readable medium of claim 15, wherein the read channel is implemented in a hard-disk drive device.

19. The computer-readable medium of claim 18, wherein the adaptive component comprises a data-dependent noise prediction ("DDNP") detector.

20. The computer-readable medium of claim 19, wherein the set of channel parameter values comprise at least one of DDNP bias values, DDNP prediction error variances, and DDNP noise-whitening filter values.

* * * * *